(12) United States Patent
Hirota

(10) Patent No.: US 8,296,809 B2
(45) Date of Patent: Oct. 23, 2012

(54) DISPLAY CONTROL TECHNIQUE FOR MAKING THE SCREEN OF A CURRENTLY-DISPLAYED PROGRAM IN A MULTI-SCREEN DISPLAY ON A DISPLAY UNIT GO INTO NON-DISPLAY AT SAID PROGRAM RECORDING SCHEDULED START TIME

(75) Inventor: Toru Hirota, Chiba (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 750 days.

(21) Appl. No.: 12/374,091

(22) PCT Filed: May 14, 2007

(86) PCT No.: PCT/JP2007/059874
§ 371 (c)(1),
(2), (4) Date: Jan. 16, 2009

(87) PCT Pub. No.: WO2008/012980
PCT Pub. Date: Jan. 31, 2008

(65) Prior Publication Data
US 2009/0256966 A1    Oct. 15, 2009

(30) Foreign Application Priority Data
Jul. 28, 2006    (JP) .................. 2006-205990

(51) Int. Cl.
*G06F 3/00* (2006.01)
*G06F 13/00* (2006.01)
*G06F 3/048* (2006.01)
*H04N 5/445* (2011.01)
*H04N 7/173* (2011.01)
*H04N 5/45* (2011.01)

(52) U.S. Cl. .............. 725/58; 725/43; 725/61; 725/110; 348/564; 348/565; 715/778

(58) Field of Classification Search .................... 725/58, 725/43, 61, 110; 348/564, 565; 715/778
See application file for complete search history.

(56) References Cited

U.S. PATENT DOCUMENTS
5,734,444 A    3/1998 Yoshinobu
(Continued)

FOREIGN PATENT DOCUMENTS
EP    1 429 552 A2    6/2004
JP    8-180504 A    7/1996
(Continued)

*Primary Examiner* — Hoang-Vu A Nguyen-Ba
(74) *Attorney, Agent, or Firm* — Birch, Stewart, Kolasch & Birch, LLP

(57) ABSTRACT

Where an instruction for a scheduled recording has been received from a remoter controller, a control unit starts the processing for display control (step S1). When the time has reached a predetermined period of time counted by a timer, for example, two minutes, before the start of the scheduled recording (step S2), the control unit determines whether or not a display unit currently displays two or more screen, and if the display unit is displaying two or more screens, the processing proceeds to step S4, and before the time for starting the scheduled recording, the controls unit makes a screen other than the screen for a program scheduled to be recorded disappear, that is, one of the screens, which displays a channel not selected for a scheduled recording, remain, and makes one screen in a multi-screen go into non-display. For example, on a TV screen, the display of a program on a BS channel for which a recording is scheduled disappears, and only the remaining BS display is provided. Next, if it is determined at step S5 that the time has reached the time for starting the scheduled recording (Yes), the processing proceeds to step S6, and the scheduled recording is started. At this time, a message to inform a user of the start of the scheduled recording can also be displayed on the display area.

13 Claims, 4 Drawing Sheets

U.S. PATENT DOCUMENTS

| | | | |
|---|---|---|---|
| 5,867,227 A * | 2/1999 | Yamaguchi | 725/56 |
| 6,052,145 A * | 4/2000 | Macrae et al. | 725/50 |
| 7,562,376 B2 * | 7/2009 | Matsuzaki | 725/43 |
| 2002/0174430 A1 * | 11/2002 | Ellis et al. | 725/46 |
| 2006/0152742 A1 * | 7/2006 | Kawabata | 358/1.1 |

FOREIGN PATENT DOCUMENTS

| | | |
|---|---|---|
| JP | 2005-26821 A | 1/2005 |
| JP | 2005-124047 A | 5/2005 |
| JP | 2005-244716 A | 9/2005 |
| JP | 2006-41933 A | 2/2006 |

* cited by examiner

US 8,296,809 B2

DISPLAY CONTROL TECHNIQUE FOR MAKING THE SCREEN OF A CURRENTLY-DISPLAYED PROGRAM IN A MULTI-SCREEN DISPLAY ON A DISPLAY UNIT GO INTO NON-DISPLAY AT SAID PROGRAM RECORDING SCHEDULED START TIME

TECHNICAL FIELD

The present invention relates to a digital broadcast receiver, and specifically relates to a display control technique related to multi-screen display.

BACKGROUND ART

Since when analog broadcast receivers had predominated, techniques for displaying plural programs on one display unit have been used. Furthermore, at the present time when digital broadcast receivers are becoming mainstream, devices capable of multi-screen display are growing popular. For example, for the digital broadcast receiver disclosed in patent document 1, patent document 1 discloses a technique for display two screens of a TV display screen and an Internet screen and also discloses a technique for smoothly switching these screens.
Patent Document 1: JP Patent Publication (Kokai) No. 2005-244716A

DISCLOSURE OF THE INVENTION

Problems to be Solved by the Invention

In conventional art including the techniques disclosed in patent document 1, for example, when processing for scheduled recording of a program is started during two screen display being provided for TV programs, one of the two screens displaying TV programs is changed to display the channel on which the scheduled recording is performed. When such change of display occurs, the user will be surprised because the program he/she was viewing until then is suddenly switched to another. Also in the subsequent processing, each time the user operates a remoter controller to, e.g., switch the channel on the screen whose display has been switched to the channel on which the scheduled recording, to another, a message to inform the use of no channel selection being allowed is displayed, which may be annoying.

An object of the present invention is to provide a display control technique that does not give a sense of discomfort to users even when processing for a scheduled recording is started during multi-screen display being provided.

Means for Solving the Problems

An aspect of the present invention provides a broadcast receiver capable of providing multi-screen display on a display unit, characterized by comprising a display control unit that performs display control to make at least one screen in a multi-screen go into non-display at a point of time when the time for starting a scheduled recording approaches during multi-screen display. Consequently, a futile operation, which cannot actually be performed, will not be repeatedly performed for a program for which a scheduled recording is performed.

The aspect of the present invention is characterized in that the display control unit performs control to expand a remaining program using the non-display area. Consequently, the area of the display unit that has gone into non-display can effectively be used. The aspect of the present invention is characterized in that the display control unit displays a message relating to the start of the scheduled recording when the time for starting the scheduled recording approaches. For example, it is possible to let a user know that the aforementioned control is being performed correctly, via a message to inform the user of the start of a scheduled recording.

The aspect of the present invention is characterized in that display provided by the display unit includes display of information obtained via the Internet, and if there is no remaining program, only the display based on the Internet is made to remain. Display based on the Internet can be provided all the time, and thus is suitable for screen display that remains last.

The display control unit can perform control to display an identification number for the non-displayed channel on the display unit. Consequently, the ID of a program that is currently being recorded according to a scheduled recording can be recognized.

Another aspect of the present invention provides a display control method for a broadcast receiver capable of providing multi-screen display on a display unit, characterized by comprising the steps of: making at least one screen in a multi-screen go into non-display at a point of time when the time for starting a scheduled recording of a currently-displayed program approaches during multi-screen display; and expanding the display of a currently-displayed program to the non-display area. A program for making a computer execute these steps also falls within the scope of the present invention.

Advantages of the Invention

According to the present invention, the screen display state is automatically switched to another so that a user cannot view the channel on which recording is performed, avoiding the user from being annoyed by a message to inform the user of no channel selection being allowed being displayed in response to the user's operation. Also, the display screen can be expanded to the area of the non-display screen, enabling effective use of the display screen.

DESCRIPTION OF SYMBOLS

A . . . digital broadcast receiver, 1 . . . antenna, 3 . . . front-end circuit (A), 5 . . . demultiplexer (A), 7 . . . picture and sound decoding unit (A), 11 . . . front-end circuit (B), 15 . . . demultiplexer (B), 17 . . . picture and sound decoding unit (B), 21 . . . screen combining unit, 23 . . . RAM, 24 . . . timer, 25 ... ROM, 27 ... control unit (CPU), 33 ... sound switching unit, 35 ... display unit, 37 ... sound output unit (A), 41 ... sound output unit (B), 45 ... remote controller light receiving unit.

BEST MODE FOR CARRYING OUT THE INVENTION

Figure 1:
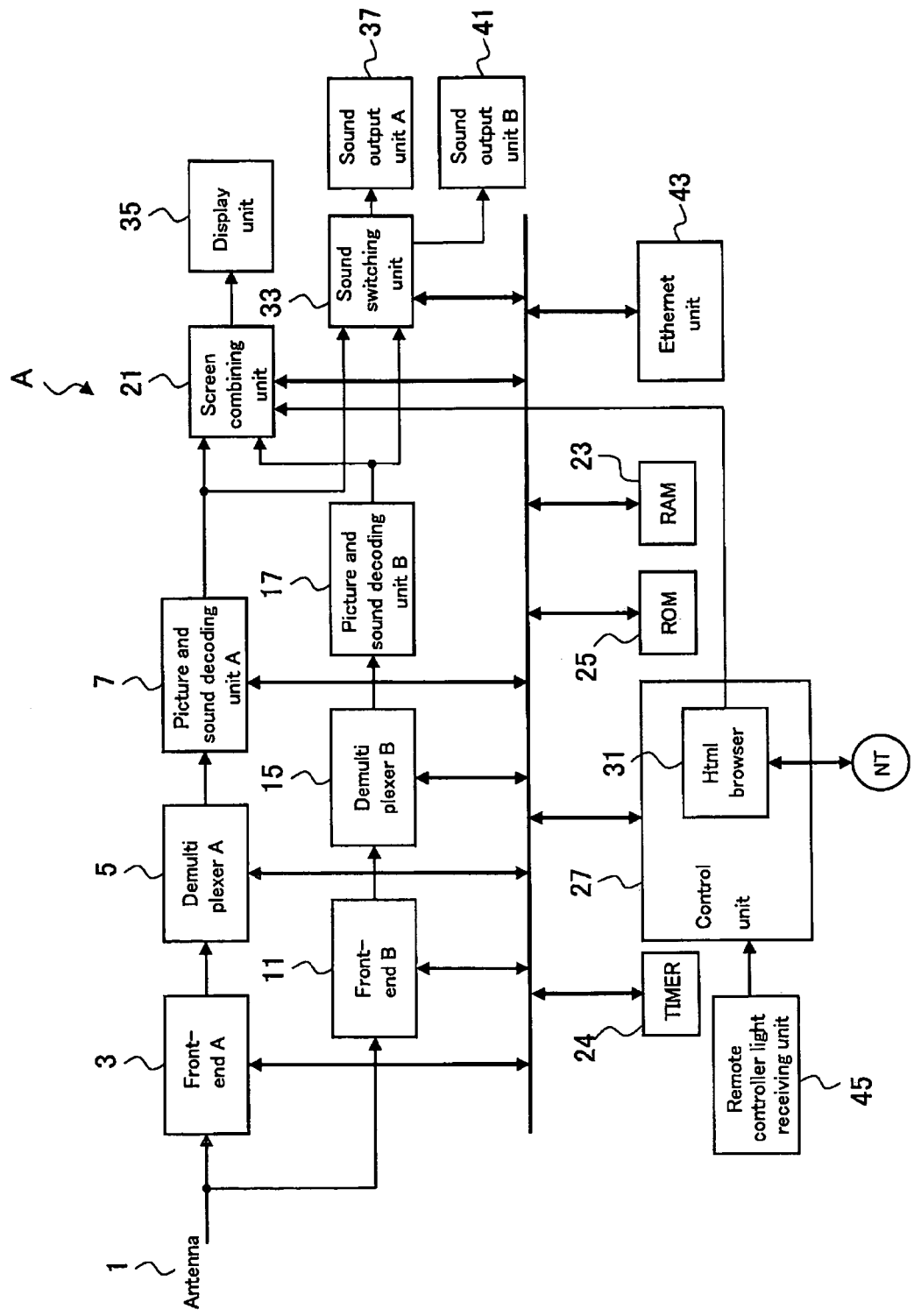
FIG. 1 is a function block diagram illustrating an example configuration of a digital broadcast receiver according to an embodiment of the present invention.

Hereinafter, a digital broadcast receiver according to an embodiment of the present invention will be described with reference to the drawings. FIG. 1 is a function block diagram illustrating an example configuration of a digital broadcast receiver according to the present embodiment. As shown in FIG. 1, a digital broadcast receiver A according to the present embodiment includes an antenna 1, a front-end circuit (A) 3, a demultiplexer (A) 5, a picture and sound decoding unit (A) 7, a front-end circuit (B) 11, a demultiplexer (B) 15, a picture and sound decoding unit (B) 17, and a timer 24 so that it can provide multi-screen display. In each of the front-end circuits, a tuner circuit, an IF demodulating circuit and a DC/DC converter circuit are integrated. Inputs from these two lines are combined by means of a screen combining unit 21 and displayed on a display unit 35, and in a sound switching unit 33, they are output to a sound output unit (A) 37 and a sound output unit (B) 41.

In a common configuration, the digital broadcast receiver further includes a ROM 25 that stores programs, etc., and a RAM 23 that develops the programs and processing them at high speed, a control unit (CPU) 27 that performs overall control, and a remote controller light receiving unit 45 that receives signals from a remoter controller. In addition, the digital broadcast receiver is provided with an Ethernet unit 43, and the control unit 27 is provided with an HTML browser, etc., enabling, e.g., obtaining contents via the Internet (NT) and displaying them on the display unit 35.

Figure 2:
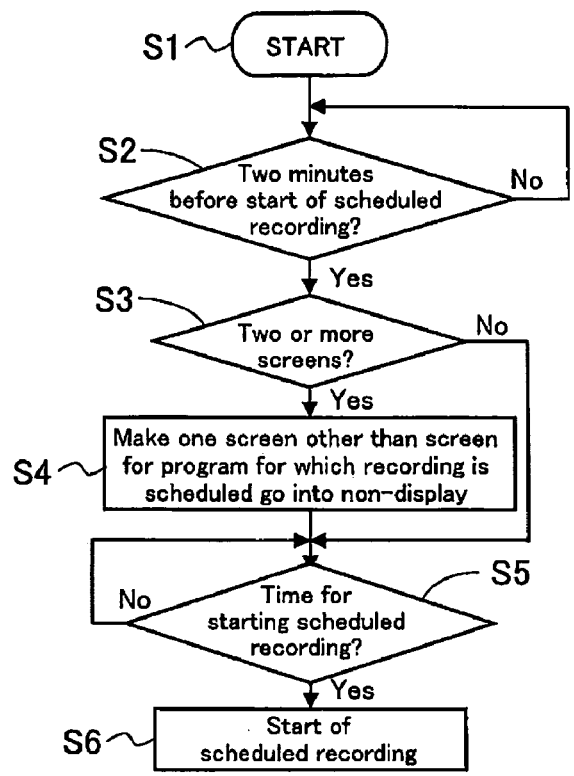
FIG. 2 is a flowchart illustrating an example of screen display processing according to an embodiment of the present invention.
Figure 3:
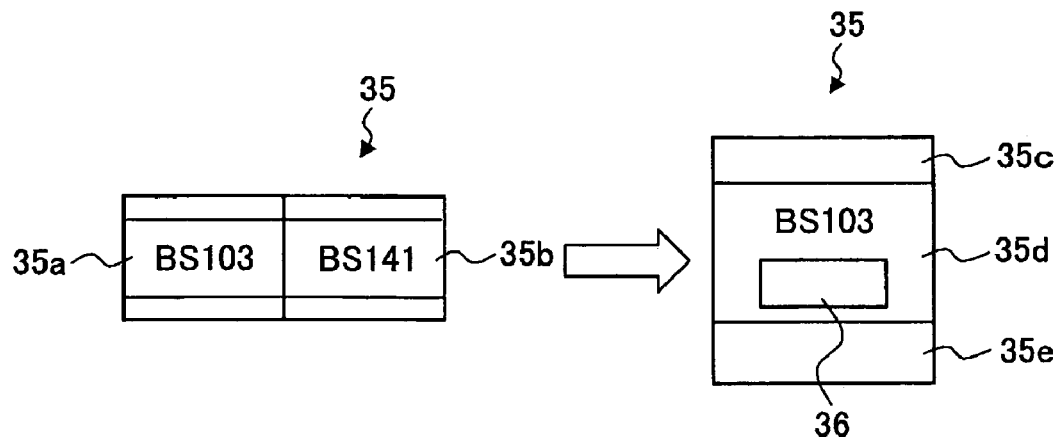
FIG. 3 is a diagram illustrating a specific display state.

FIG. 2 is a flowchart illustrating an example of screen display processing according to the present embodiment, and FIG. 3 is a diagram illustrating a specific display state. Where the remote controller light receiving unit 45 has received an instruction for a scheduled recording from a remote controller (not shown) during programs, etc., displayed on the digital TV receiver being viewed, the control unit 27 starts processing for display control (step S1). When the time has reached a predetermined period of time counted by the timer 24, for example, two minutes, before the start of the scheduled recording (step S2), the control unit determines whether or not the display unit 35 currently displays two or more screens, and if the display unit 35 is displaying two or more screens (Yes: in the display unit 35 shown in FIG. 3, a TV program on the BS103 channel is displayed in a display area 35a and a TV program on BS141 is displayed on a display area 35b), the processing proceeds to step S4, and before the time for starting the scheduled recording, the control unit controls the display so that: a screen other than the screen for the program scheduled to be recorded, that is, one of the screens, which displays a channel not selected for a scheduled recording, is made to remain; and if a program on the channel for which the recording is scheduled is displayed, the screen is not displayed on the display unit (e.g., makes the screen go into non-display). For example, as shown in the right-side drawing in FIG. 3, on the TV screen 35, display of a program on the BS141 channel on which recording has been scheduled has disappeared, and only the remaining display 35d for BS103 is displayed. Whether or not margin areas 35c and 35e are provided can arbitrarily be determined.

Next, if it is determined at step S5 that the time has reached the time for starting the scheduled recording (Yes), the processing proceeds to step S6, and the scheduled recording is started. At this time, it is favorable that, for example, a message to inform a user of the start of the scheduled recording is displayed on the display area indicated by reference numeral 36. As a result of informing the user of the scheduled recording being underway via this display, it is possible to let the user know that processing, such as switching the channel to another, cannot be performed even if he/she switches the screen back to multi-screen display.

As described above, when plural programs including a program for which a recording is scheduled are displayed, the display is controlled so that the program for which a recording is scheduled among them is not displayed, providing the advantage of preventing an unwanted message, such as "no channel selection is allowed," from being displayed in response to the user's operation that may be performed when the program for which a recording is scheduled is still displayed on the screen. The display of the remaining program may be expanded according to the area that can provide display, which is widened because of non-display of the program for which a recording is scheduled or may also be made to be a margin area. In other words, the program for which a recording is scheduled may be displayed in a sub-screen or only the channel number of the program may be displayed.

Figure 4:
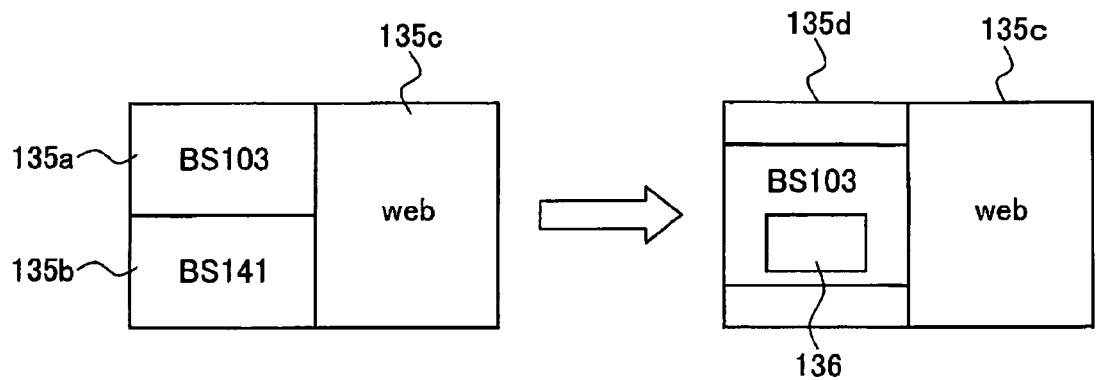
FIG. 4 is a diagram illustrating an example of screen display according to a first modification of an embodiment of the present invention, which is another display example of that shown in FIG. 3.

Next, a first modification of the present embodiment will be described with reference to the drawings. FIG. 4 is a diagram illustrating another display example of that shown in FIG. 3. In the drawing shown in the left side of FIG. 4, a program on BS103 is displayed in a display area 135a, a program on BS141 is displayed in a display area 135b, and a Web screen 135c obtained via the Internet is displayed on the display area 135c. In this multi-screen display state, as with the case of FIG. 3, if recording of a program on BS141 is scheduled, as shown in the right-side drawing in FIG. 4, the program on BS141 goes into non-display, e.g., approximately two minutes before the start of the scheduled recording, the display of the program on BS103 and the display of the Web screen 135c remain. Furthermore, a message to inform a user of the start of the scheduled recording may be displayed in an area 136. When the scheduled recording has been finished, a program on the same channel may be displayed, or may also not be displayed. Which to choose may be set in advance. As described above, the principle is the same between the case where a Web screen obtained via the Internet is displayed and the case where broadcast programs are displayed on a multi-screen (the first modification).

Figure 5:
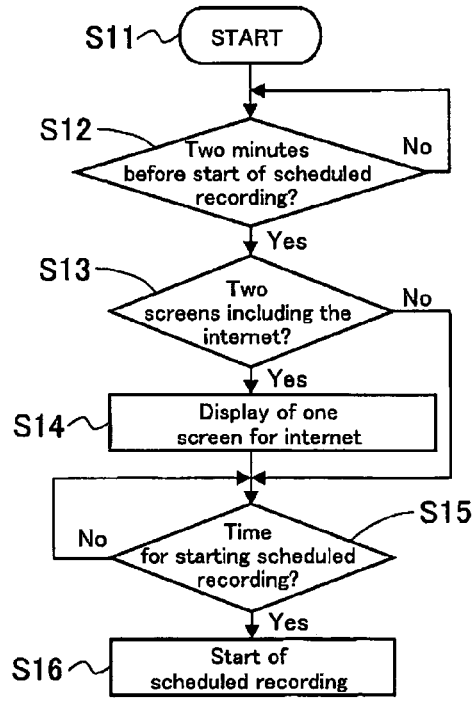
FIG. 5 is a flowchart illustrating the flow of display control processing according to a second modification of an embodiment of the present invention.
Figure 6:
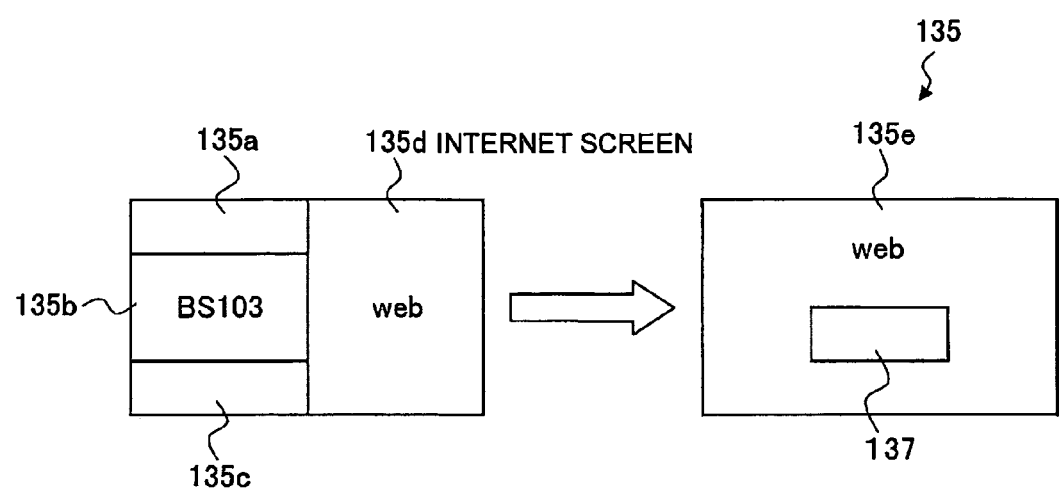
FIG. 6 is a diagram illustrating an example of display following the flow shown in FIG. 5.

Next, a second modification of the present embodiment will be described with reference to the drawings. FIG. 5 is a flowchart illustrating the flow of display control processing according to the second modification. FIG. 6 is a diagram illustrating an example of display following the flow shown in FIG. 5. It is a diagram illustrating an example of the case where two screens including a Web screen is displayed.

As shown in FIG. 5 (and FIG. 1), where the remote controller light receiving unit 45 has received an instruction for a scheduled recording from the remoter controller (not shown), the control unit 27 starts processing for display control (step S11). When the time has reached a predetermined period of time counted by the timer, for example, two minutes, before the start of the scheduled recording (step S12), the control unit 27 determines whether or not the display unit 135 currently display two or more screens including Web display via the Internet (step S13), and as shown in the left-side drawing in FIG. 6, if it displays two or more screens that provide first display 135b on the BS103 channel and Web display 135d (Yes), the processing proceeds to step S14, and before the time for starting the scheduled recording, the control unit controls the display so that a screen other than the screen for the program scheduled to be recorded, that is, the screen which displays a channel not selected for a scheduled recording (BS103) is made to go into non-display, and as shown in 135e in FIG. 6, only one screen that provides the Web display is displayed on the display unit, and the control unit makes a message 137 to inform a user of the start of the scheduled recording be displayed. Next, if it is determined at step S15 that the time has reached the time for the start of the scheduled recording (Yes), the scheduled recording of, e.g., a program on BS103 is started at step S16.

As described above, according the digital TV receiver according to the present embodiment, during multi-screen display, if a recording is scheduled for a program on the same channel as that of the displayed program, when the time has reached the time a certain period of time before the start of recording based on the scheduled recording, the display of the program on the channel for which the recording is scheduled is made to disappear, resulting in that only the remaining program or Web screens are displayed. Which program to turn into non-display according to the scheduled recording may be determined via the settings by the user.

Accordingly, it is possible to prevent the user from mistakenly recognize the program as a program being currently viewed, for which a scheduled recording is not underway, and performing processing for switching the program to another. Thus, the advantage of reducing futileness and annoyance related to users' operations can be obtained.

Although the above embodiment has been described in terms of a digital broadcast receiver as an example, it should be understood that analog broadcasting may be mixed.

Also, when plural recordings are scheduled, it is preferable the control is performed to make the display of programs for which the recordings are scheduled disappear at times a short period of time before the times of the respective recordings. Where an interactive communication-enabled remote controller is used, the control may be performed so as to disable operations related to a program for which a recording is scheduled.

INDUSTRIAL APPLICABILITY

The present invention can be employed for a digital broadcast receiver that can provide multi-screen display.

The invention claimed is:

1. A broadcast receiver capable of providing multi-screen display on a display unit, the broadcast receiver comprising a display control unit that performs display control to make at least one screen in a multi-screen go into non-display of a currently-displayed program at a point of time when the time for starting a scheduled recording for the currently-displayed program approaches during multi-screen display, wherein the broadcast receiver performs recording of the currently-displayed program at the time for starting the scheduled recording.

2. The broadcast receiver according to claim 1, wherein the display control unit performs control to expand a remaining program using the non-display screen.

3. The broadcast receiver according to claim 2, wherein the display control unit displays a message relating to the start of the scheduled recording when the time for starting the scheduled recording approaches.

4. The broadcast receiver according to claim 2, wherein the display provided by the display unit includes display of information obtained via the Internet, and if there is no remaining program, only the display based on the Internet is made to remain.

5. The broadcast receiver according to claim 2, wherein the display control unit performs control to display an identification number for the non-displayed program on the display unit.

6. The broadcast receiver according to claim 1, wherein the display control unit displays a message relating to the start of the scheduled recording when the time for starting the scheduled recording approaches.

7. The broadcast receiver according to claim 6, wherein the display provided by the display unit includes display of information obtained via the Internet, and if there is no remaining program, only the display based on the Internet is made to remain.

8. The broadcast receiver according to claim 6, wherein the display control unit performs control to display an identification number for the non-displayed program on the display unit.

9. The broadcast receiver according to claim 1, wherein the display provided by the display control unit includes display of information obtained via the Internet, and if there is no remaining program, only the display based on the Internet is made to remain.

10. The broadcast receiver according to claim 4, wherein the display control unit performs control to display an identification number for the non-displayed program on the display unit.

11. The broadcast receiver according to claim 1, wherein the display control unit performs control to display an identification number for the non-displayed program on the display unit.

12. A display control method for a broadcast receiver capable of providing multi-screen display on a display unit, the display control method comprising the steps of:
making at least one screen in a multi-screen go into non-display of a currently-displayed program at a point of time when the time for starting a scheduled recording of the currently-displayed program approaches during multi-screen display, wherein the display control method includes recording of the currently-displayed program at the time for starting the scheduled recording; and
expanding the display of another currently-displayed program to the non-display screen.

13. A non-transitory computer-readable medium coupled to one or more processors having instructions stored thereon that, when executed by said one or more processors, cause said one or more processors to perform operations comprising:
making at least one screen in a multi-screen go into non-display of a currently-displayed program at a point of time when the time for starting a scheduled recording of a currently-displayed program approaches during multi-screen display, wherein the operations include recording of the currently-displayed program at the time for starting the scheduled recording; and
expanding the display of another currently-displayed program to the non-display screen.

* * * * *